(12) United States Patent
Clark, II

(10) Patent No.: US 10,214,049 B2
(45) Date of Patent: Feb. 26, 2019

(54) SPINNER FOR VEHICLE WHEEL

(71) Applicant: Michael Todd Clark, II, Oak Park, MI (US)

(72) Inventor: Michael Todd Clark, II, Oak Park, MI (US)

( * ) Notice: Subject to any disclaimer, the term of this patent is extended or adjusted under 35 U.S.C. 154(b) by 0 days.

(21) Appl. No.: 15/350,749

(22) Filed: Nov. 14, 2016

(65) Prior Publication Data

US 2017/0080748 A1 Mar. 23, 2017

Related U.S. Application Data

(63) Continuation-in-part of application No. 14/508,540, filed on Oct. 7, 2014, now Pat. No. 9,527,342, which is a continuation-in-part of application No. 13/385,482, filed on Feb. 22, 2012, now Pat. No. 8,882,205.

(60) Provisional application No. 61/464,275, filed on Mar. 2, 2011.

(51) Int. Cl.
*B60B 7/20* (2006.01)
*B60B 7/04* (2006.01)
*B60B 7/00* (2006.01)
*B60B 7/06* (2006.01)

(52) U.S. Cl.
CPC .............. *B60B 7/20* (2013.01); *B60B 7/006* (2013.01); *B60B 7/0006* (2013.01); *B60B 7/008* (2013.01); *B60B 7/04* (2013.01); *B60B 7/063* (2013.01); *B60B 2900/572* (2013.01)

(58) Field of Classification Search
CPC .......... B60B 7/20; B60B 7/04; B60B 7/0006; B60B 7/008; B60B 7/063

USPC .............. 301/37.102, 37.25, 37.106, 37.108, 301/37.109; 40/587

See application file for complete search history.

(56) References Cited

U.S. PATENT DOCUMENTS

| 2,997,344 | A | * | 8/1961 | Whiteman | ................. | B60B 7/20 |
| | | | | | | 301/37.25 |
| 3,155,430 | A | * | 11/1964 | Schindler | .................. | B60B 7/20 |
| | | | | | | 301/37.25 |
| 3,158,946 | A | | 12/1964 | Upchurch | | |
| 3,219,391 | A | | 11/1965 | Hetinger | | |

(Continued)

FOREIGN PATENT DOCUMENTS

| WO | 00/76787 | 12/2000 | | |
| WO | WO-0076787 A1 | * | 12/2000 | ............... B60B 7/20 |

(Continued)

*Primary Examiner* — Kip T Kotter
(74) *Attorney, Agent, or Firm* — Mitchell Intellectual Property Law, PLLC

(57) ABSTRACT

A vehicle wheel spinning device comprising a disk shaped housing having a front and back disk forming a cavity therein is disclosed. The front disk has a series of decorative apertures formed therein. A spinning disk is rotatably mounted within said cavity. Various visual effects are produced by providing on the surface of the spinning disk facing the front disk of said housing at least one section of a contrasting color to the remainder of the surface. When the spinning disk rotates the colors show through said apertures during rotation of the spinning ring. The spinning device is attached to the front of a vehicle wheel in a manner that the housing rotates with the wheel and the spinning disk rotates separately from the rotation of the housing and continues to rotate for a time after the wheel stops spinning.

13 Claims, 18 Drawing Sheets

(56) References Cited

U.S. PATENT DOCUMENTS

| | | | |
|---|---|---|---|
| 3,722,958 A | 3/1973 | Marshall | |
| 4,388,771 A * | 6/1983 | Lalonde | G09F 21/045 |
| | | | 301/37.25 |
| 5,290,094 A | 3/1994 | Dragg | |
| 5,659,989 A | 8/1997 | Hsiao et al. | |
| 6,309,027 B1 * | 10/2001 | Smith | B60B 7/0053 |
| | | | 301/37.109 |
| 6,554,370 B2 | 4/2003 | Fowlkes | |
| 6,568,110 B2 * | 5/2003 | Lee | B60R 13/00 |
| | | | 40/587 |
| 6,575,537 B1 | 6/2003 | Wang | |
| 6,663,187 B2 | 6/2003 | Fitzgerald | |
| 6,637,830 B1 | 10/2003 | Burgess | |
| 6,655,061 B1 | 12/2003 | Good | |
| 6,702,396 B1 | 3/2004 | Wang | |
| 6,848,751 B1 * | 2/2005 | Yuan | B60B 7/20 |
| | | | 301/37.107 |
| 6,942,303 B2 | 9/2005 | Smith et al. | |
| 6,945,609 B2 | 9/2005 | Barney | |
| 7,014,273 B1 | 3/2006 | Yang et al. | |
| 7,100,995 B2 | 9/2006 | Gilly et al. | |
| 7,121,631 B2 | 10/2006 | Strzelczyk | |
| 7,182,408 B2 | 2/2007 | Rivers, Jr. et al. | |
| 7,354,113 B2 | 4/2008 | Marriott | |
| 2002/0125761 A1 * | 9/2002 | Matushita | B60B 7/20 |
| | | | 301/37.25 |
| 2004/0183359 A1 | 9/2004 | Fowlkes | |
| 2005/0121968 A1 * | 6/2005 | McCaster, III | B60B 7/20 |
| | | | 301/37.25 |
| 2006/0028059 A1 * | 2/2006 | Choe | B60B 7/20 |
| | | | 301/108.1 |
| 2006/0220440 A1 | 10/2006 | Treacy | |

FOREIGN PATENT DOCUMENTS

| | | | | |
|---|---|---|---|---|
| WO | WO-03010010 A1 * | 2/2003 | | B60B 7/20 |
| WO | WO-2007032628 A1 * | 3/2007 | | B60B 7/20 |
| WO | WO-2011005035 A2 * | 1/2011 | | B60B 7/20 |

* cited by examiner

SPINNER FOR VEHICLE WHEEL

RELATED APPLICATIONS

This application is a continuation-in-part of application Ser. No. 14/508,540, filed on Oct. 7, 2014, now U.S. Pat. No. 9,527,342 B2, which is a continuation-in-part of application Ser. No. 13/385,482 filed on Feb. 22, 2012, now U.S. Pat. No. 8,882,206 B2, which relates to and claims priority to U.S. Provisional Application Ser. No. 61/464,275, entitled "SPINNER. FOR VEHICLE WHEEL," filed Mar. 2, 2011, all of which are incorporated by, reference in their entirety.

TECHNICAL FIELD

The invention pertains to a wheel spinner device for attachment to a vehicle wheel that contains a spinner that spins independently of the wheel itself.

BACKGROUND OF THE INVENTION

It has been reported in the literature that the original free-spinning spinner was made in the 1980s. However, revolving wheel disk covers were previously reported in U.S. Pat. Nos. 3,158,946 and 3,219,391. Examples of other wheel spinners have been disclosed in U.S. Pat. Nos. 6,554,370; 6,655,061; 6,945,609; 7,014,273; 7,100,995; 7,121,631 and 7,182,408. None of these patents teach or suggest the novel wheel spinner taught and claimed herein.

Wheel spinners have been used on vehicles such as automobiles, SUVs, motorcycles and trucks to provide a novel visual effect of a part spinning at different speeds than the wheel and to continue to spin when the vehicle has stopped. The development of wheel spinners has primarily focused on a spinner device attached to a vehicle wheel (rim) that rotates at a different speed than the wheel and continues to rotate when the vehicle stops. Most of these spinners have one common feature; they attach to the center of the wheel, generally at the hub, and rotate essentially within the area of the rim itself. The spinner portion is usually a non-enclosed spinning blade or spokes that can cause a danger to anyone, especially small children, who may place his or her finger into the wheel while the spinner is still spinning. Also the spinners are limited to spinning spokes or blades with no ability to show motion created by color changes. Finally the spinning elements are open to the environment and thus, salt ice, packed snow and the like can affect the performance of the spinner. Lastly the spinner is located in the center of the wheel and does not hide at least a portion of the tire. An object of the present invention is to provide a novel aesthetic effect through the use of a unique spinner device and color changes. Another object is to improve upon the negative features of prior spinners.

SUMMARY OF THE INVENTION

A spinning device for a vehicle wheel is disclosed comprising: a housing having a front and back ring forming a cavity therein, the front ring containing at least one decorative aperture formed therein; a spinning ring mounted within the cavity of the housing in a manner that the spinning ring rotates upon rotation of the wheel and continues to rotate for a time after the wheel stops, said surface of the spinning ring facing the front ring of said housing having one section of a contrasting color to the remainder of the spinning ring such that when it rotates within the cavity the color showing through said aperture changes during rotation of the spinning ring. The housing is attached to the front of the vehicle wheel in a manner that the housing rotates with the wheel and the spinning ring rotates separately from the rotation of the housing and continues to rotate for a time after the wheel stops spinning. Ring as used means a circular plate optionally having a centrally located hole.

Other embodiments are also disclosed.

In one embodiment a donut shaped spinning device for a vehicle wheel is disclosed comprising: a donut shaped housing having a front and back ring forming a cavity therein, the front ring containing at least one decorative aperture formed therein; a spinning ring mounted within the cavity of the housing in a manner that the spinning ring rotates upon rotation of the wheel and continues to rotate for a time after the wheel stops, said surface of the spinning ring facing the front ring of said housing having one section of a contrasting color to the remainder of the spinning ring such that when it rotates the colors showing through said aperture change during rotation of the spinning ring, and means for attaching the housing to the vehicle wheel in a manner that the housing rotates with the wheel and the spinning ring rotates separately from the rotation of the housing and continues to rotates for a time after the wheel stops spinning.

In another embodiment a spinning device adapted to be attached to the front of a vehicle wheel is provided comprising: a housing having a front and back circular plate (disk) whose axis are centrally aligned and a circular ring spacer separating said front and back circular plates forming a cavity therein, the front plate contains at least one decorative aperture formed therein; a shaft bearing combination is centrally attached inside said cavity at the axis of said front and back plates such that the axis of said shaft is aligned with said axis of said from and back disk; a spinning disk having a front surface is mounted within the cavity of the housing to said shaft bearing combination centrally attached inside said in a manner that when the housing is attached to the front side of a vehicle wheel the spinning disk rotates inside said cavity upon rotation of the wheel and continues to rotate for a time after the wheel stops, and the front surface of the spinning disk facing the back side of said front plate of said housing having one section of a contrasting color to the remainder of the spinning disk such that when said disk rotates the colors showing through said at least one aperture change during rotation of the spinning disk. In one embodiment the shaft bearing combination is centrally mounted to the inside surface of said front plate and comprises a shaft spinning in said bearing and extending perpendicularly in said cavity from the front plate and said spinning disk is mounted on said shaft to rotate with said shaft in said cavity. In another embodiment the shaft bearing combination is centrally mounted to the inside surface of said front plate and comprises a stationary shaft mounted to said front plate and extending perpendicularly from the front plate said shaft having a bearing mounted on said shaft and said spinning disk is mounted on said bearing to rotate therewith. The shaft hearing combination can instead be mounted to the back plate in a similar manner.

The primary object of the invention is to improve on the known spinners by providing a donut shaped wheel spinning device 10, comprising housing 11 that encloses in its cavity a freely rotatable flat spinning ring 12 having at least one contrasting color portion 13 on the front surface.

The face of the housing includes apertures 14 extending through a least a portion of the face. The spinning device can be constructed for example by assembling three flat rings: a front ring 15 that has a series of apertures 14 of various design such that when the internal spinning flat ring 12 rotates it forms a visual effect caused by the contrasting colored portion 13 passing by the open design of the front ring: a back ring 16; two spacers, an inner spacer 17 and an outer spacer 18 interposed between the front and the back rings; and positioned in the housing 11 formed by the front and back rings and the two spacers the freely spinning flat spinning ring 12. When assembled the front and back rings along with the spacers form the housing 11 in which the spinning flat ring 12 is rotatably mounted. The assembled spinning device 10 is attached to the wheel 31 of an automobile, motorcycle, truck and the like in any suitable manner such as by torsion bolts, clips and the like. The inner circumference of spinning flat ring 12 sits on bearings 19 and is urged into rotation when the wheel turns and continues to spin when the wheel stops spinning thus continuing the visual effect. Since the housing is attached to the wheel the housing rotates with the wheel and stops when the wheel stops.

The spinning device may, in one embodiment, be sealed to the environment so that weather conditions do not affect its performance.

In another embodiment the spinning device hides at least a portion of the tire. In another embodiment at least the front ring comprises a flat plate containing decorative apertures 14 and is free of the centrally located hole 50 of the donut shaped housing shown in FIGS. 1, 2, 3 and 4.

These and other objects and advantages of the present invention will become apparent from the subsequent detailed description of the embodiments and the appended claims taken in conjunction with the accompanying drawings. The following description will teach various embodiments of the invention but the invention is not so limited.

BRIEF DESCRIPTION OF THE DRAWINGS

The corresponding numbers in the different views refer to the same part. Only an illustrative view of the fasteners are shown. In order to more clearly illustrate the fitting and association of the parts they are not necessarily drawn to scale.

DETAILED DESCRIPTION OF THE INVENTION

Figure 1:
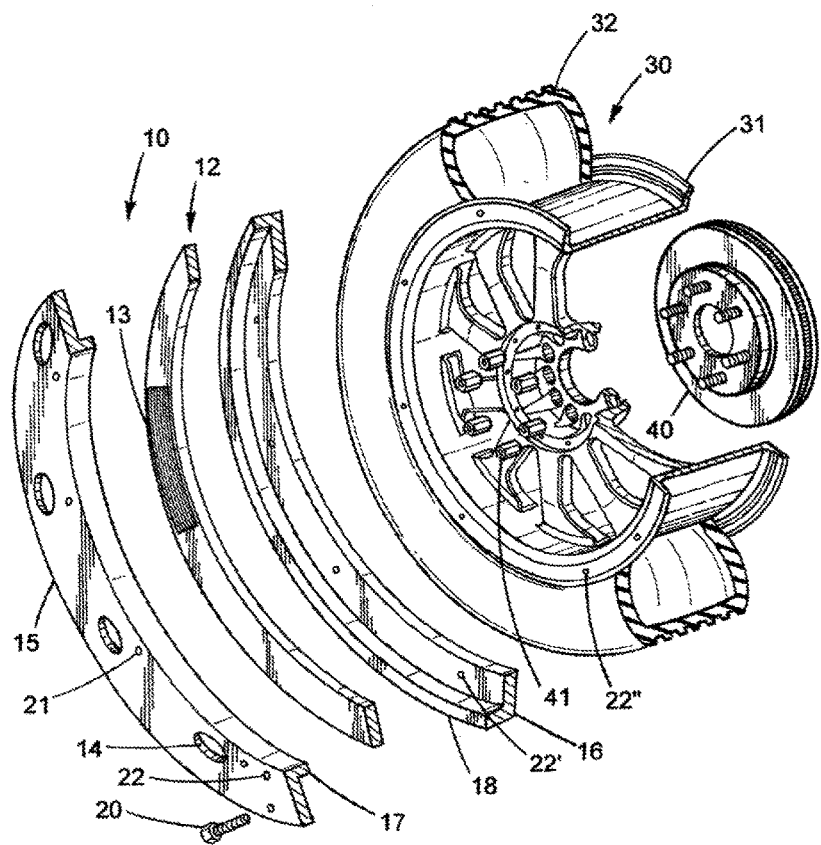
FIG. 1 is a partial isometric cross sectioned exploded view of an embodiment of the spinning device 10 mounted on an automotive wheel wherein the spinning device is sized to hide a portion of the tire 32 and leave open to view a major portion of the wheel.

One variation of the spinning device shown n FIGS. 1-4 comprises a donut shaped spinning device for a vehicle wheel comprising: a donut shaped housing 11 having a front ring 15 and a back ring 16 forming a cavity therein, the front ring containing at least one decorative aperture 14 formed therein; a spinning ring 12 is mounted within the cavity of the housing in a manner that the spinning ring rotates upon rotation of the wheel 31 and continues to rotate for a time after the wheel stops, said surface of the spinning ring facing the front ring of said housing having one section 13 of a contrasting color to the remainder of the spinning ring such that when it rotates the colors showing through said aperture(s) change during rotation of the spinning ring, and means for attaching the housing to the vehicle wheel in a manner that the housing rotates with the wheel and the spinning ring rotates separately from the rotation of the housing and continues to rotates for a time after the wheel stops spinning. In this embodiment the three rings each have a central opening hole 50 that permits a view of at least a portion of the wheel 31. In this embodiment lug nuts 41 can be exposed and the wheel can be removed from and attached to the hub assembly without removing the spinning device from the wheel. Moreover the device can be attached to the outside of wheels that contain an axle that mounts on a fork such as used on motorcycles to mount and attach the wheels of the motorcycle. The donut shaped housing having the opening hole 50 in the center permits the axle to extend through the mounted device. In another variation shown in FIGS. 5, 5A and 6 a closed front plate (disk) 115 is a used instead of a front ring and contains decorative apertures 114 and optionally holes 21, 22, and 22' used to attach the front plate to the back ring 116 and the housing to the front of a wheel. If desired the spinning ring or the back ring or both can also be replaced with disks not having a ring shape having a centrally located hole 50. The spinning device 10, comprises ring shaped housing 11 that encloses in its cavity a freely rotatable flat spinning ring 12 having at least one contrasting color portion 13 on the front surface thereof.

Figure 3:
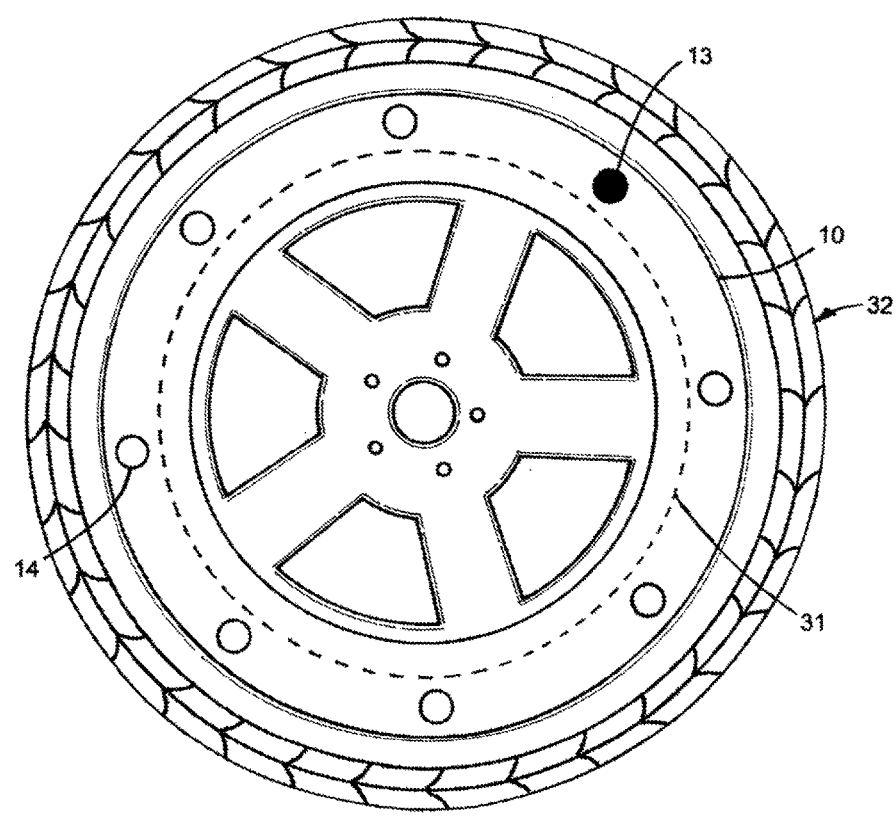
FIG. 3 is front view of the spinning device 10 attached to a rim and partially hiding a tire 32 and leaving an open view of a majority of the wheel 31. The dashed line depicts the outer circumference of the rim.
Figure 4:
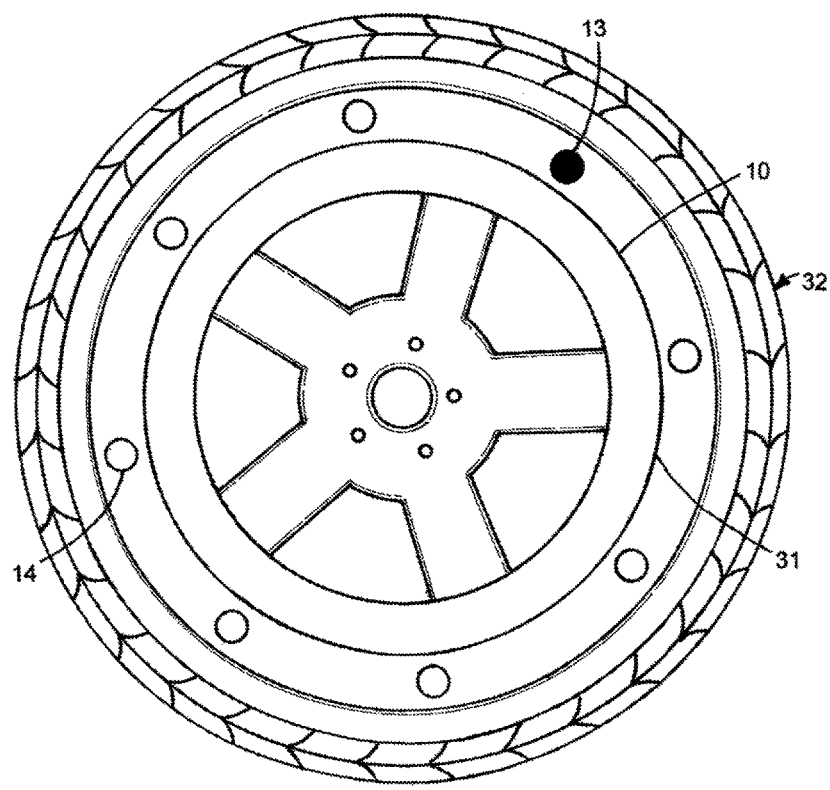
FIG. 4 is a front view of another embodiment where the spinning device has an outer circumference approximately the same size as the outer circumference of the rim and an inner circumference of a size that hides at least a portion of the rim.
Figure 5:
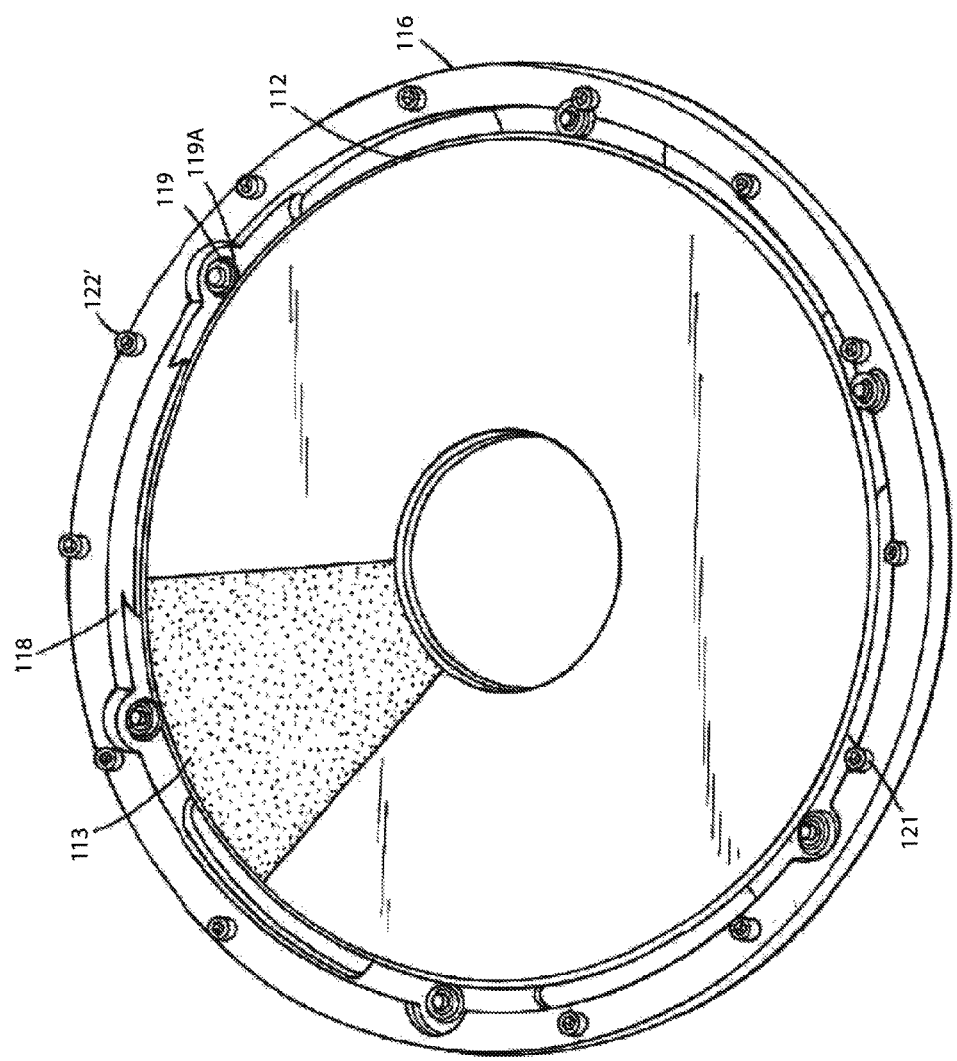
FIG. 5 is a front view of another embodiment of the spinning device wherein a front plate (disk) 115, shown in FIG. 5A, includes decorative apertures 114 and is free of the central hole 50 illustrated in FIGS. 1 and 2 and the spinning ring 112 with contrasting colored portion 113 is mounted inside the housing 11 on bearings 119 having groove 119A which rotatably hold the spinning ring 112 on the outer peripheral circumference of the spinning ring 112.
Figure 6:
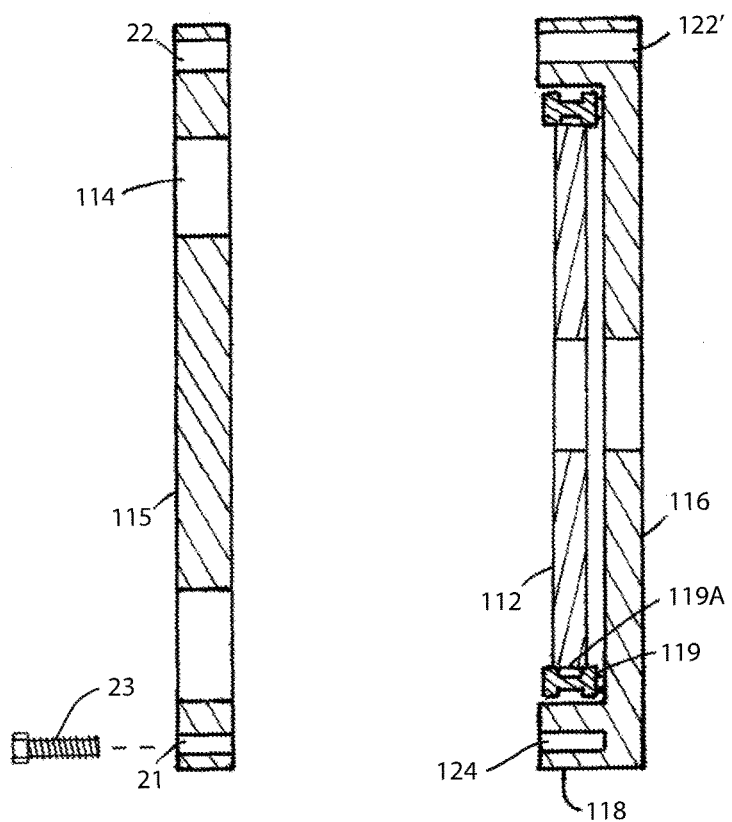
FIG. 6 is a partial cross section side view of the embodiment of FIGS. 5 and 5A wherein the front plate (disk) 115 is detached from the back ring 116 and the spinning ring 112.

In the embodiment shown in FIGS. 5-6 at least the front ring of the spinning device is replaced with a plate (disk) 115 having the decorative apertures 114 but not the centrally located hole 50 in FIGS. 1-4. Also in this embodiment bearings 119 having groove 119A are placed on the outer periphery of the back ring in the housing so the spinning ring 112 is supported along the outer periphery (circumference) of the spinning ring 112.

FIG. 1 shows one embodiment of invention for the wheel spinning device 10 associated with an automotive wheel 31 and tire 32, taken together referred to as 30 in FIG. 1. This embodiment comprises a back ring 16, a front ring 15 with decorative holes 14 positioned therein. Positioned between the back ring and the front ring is a spinning flat ring, 12 that has at least one portion of the front face a contrasting color 13. Interposed between the front and back plates are two spacers an inner spacer 17, and an outer spacer 18. As shown the spacers can be formed from continuous rings and be formed as part of the front and back rings. They can also be formed of individual parts spaced from one another and secured around the inner faces of the front and back rings. The spinning ring 12 is rotatably fitted in the housing such that its outer diameter (periphery) does not touch the outer spacer 18 and its inner diameter sits on bearings 19 secured around the inner spacer 17. The spinning ring 12 should not touch the inner surfaces of the front and back rings. When the device is assembled it forms a housing 11 with the spinning ring 12 located in the interior (see FIG. 2). The inner diameter of the spinner sits on bearings 19 so it can spin (rotate) independently of the housing and the wheel. The housing is fixed to the wheel and rotates with the wheel.

Preferably the spinning device is removable from the wheel to facilitate tire changes, change of design and the like.

The back ring, front ring and rotatable spinning ring are designed to be assembled into a unit in a manner that the rotatable spinning ring 12 starts to rotate when the wheel is spinning and continues to rotate for a time when the wheel stops.

Figure 8:
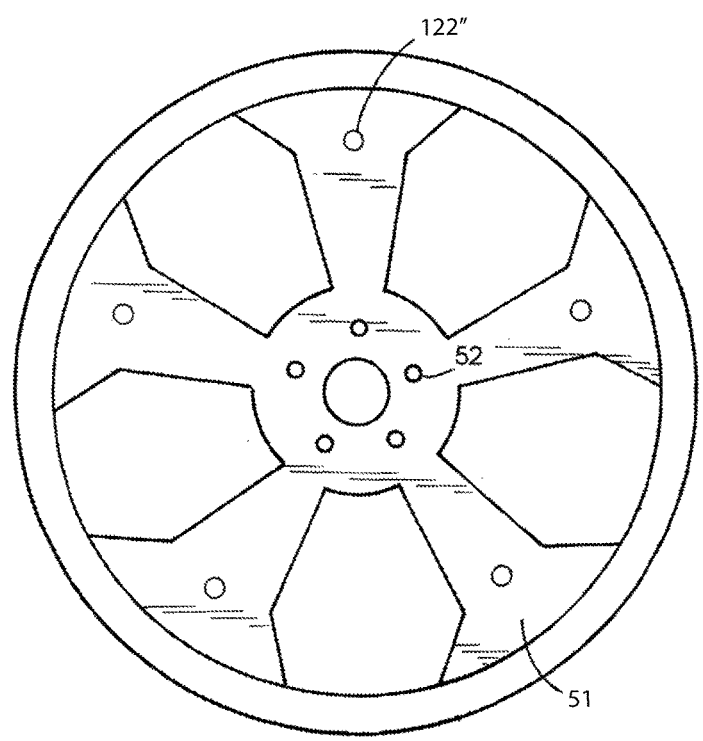
FIG. 8 shows a front view of a wheel designed to permit the housing 11 to be bolted to the wheel with the bolt holes 122" being formed in the spokes 51.

The spinning device 10 is mounted onto a wheel, in this embodiment using bolts 20 that pass through the front ring and back ring through holes 22 and 22' and attach to the rim at threaded locations 22" that align with the holes going through the housing. Other means of fastening the device to the rim can be employed such as with spring clips and the like. An example of a suitable wheel is shown in FIG. 8 with spokes 51 containing bolt holes 22" for attaching, with for example torsion bolts. Also are shown lug stem holes 52.

In the embodiments shown in FIG. 1 and FIG. 3 the dimensions of the spinning device 10 are such that it covers (hides) a portion of the tire and a minimal portion of the wheel. In other embodiments, as shown in FIG. 4 for example, the spinning device may only cover a portion of the wheel or in another embodiment, not shown, a portion of both the wheel and the tire. In the embodiment shown in FIGS. 5, 5A and 6 the front plate (disk) is closed except for the decorative apertures and the holes 21 and 22 such that the major portion of the front of the wheel is hidden from view.

Figure 14:
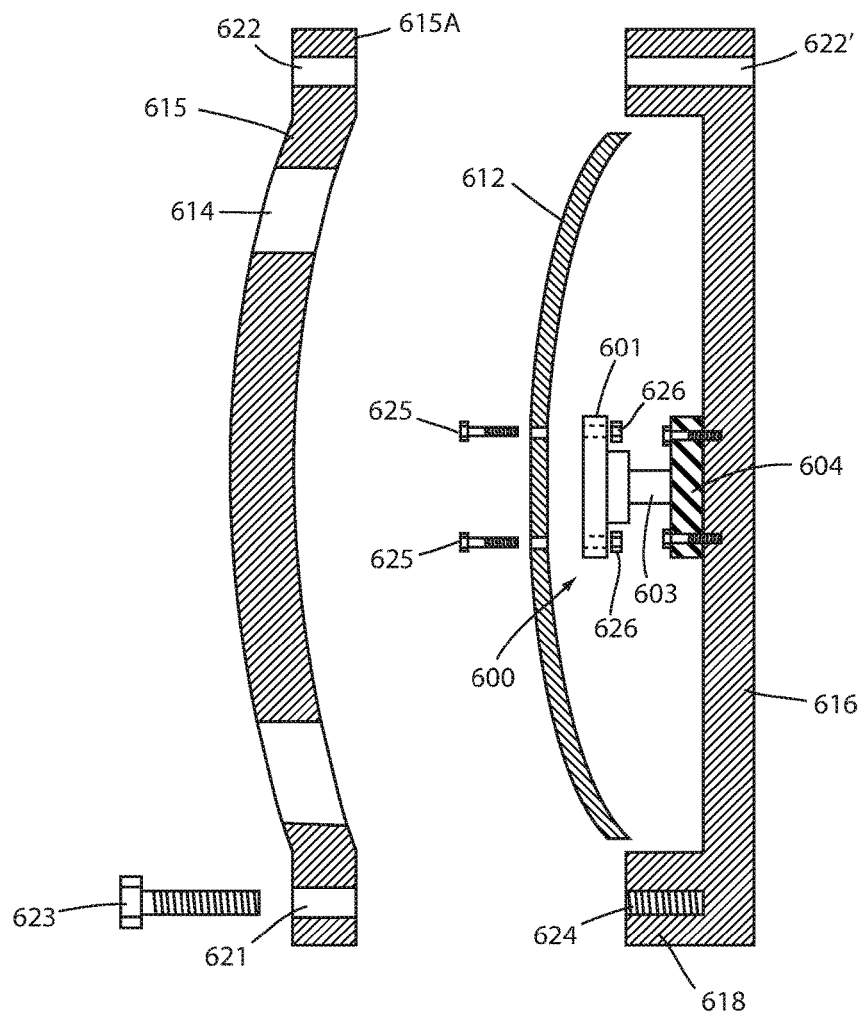
FIG. 14 illustrates a cross-sectional exploded side view of an embodiment of the invention wherein the front disk 615 and the spinning disk 612 are convex shaped and the spinning disk is mounted in the housing using a shaft bearing combination wherein the shaft 603 is fixed to the back plate 616 using a flange 604 and the flange mounting bearing is fixed to the spinning disk using a flange 601 attached to the bearing such that the spinning disk and the bearing continue to rotate when the shaft and the wheel stop rotating.

The embodiments shown in the FIGS. 1-6 show the housing and the front, spinning and back rings as being flat. However, at least the front ring can be convex, concave or flat shaped. If desired the three rings, front, spinning and back, can be concave, convex or flat shaped. FIG. 14 shows an embodiment wherein the front disk 615 and the spinning disk 612 are convex shaped and in FIG. 15 an embodiment is shown wherein the front disk 715 and the spinning disk 712 are concave shaped. Different shapes add ascetic variations and also find usefulness on different styles and shaped wheels.

The wheel assembly is provided with conventional rake rotor 40 and lug nuts 41 that are standard in the automotive industry.

Figure 5A:
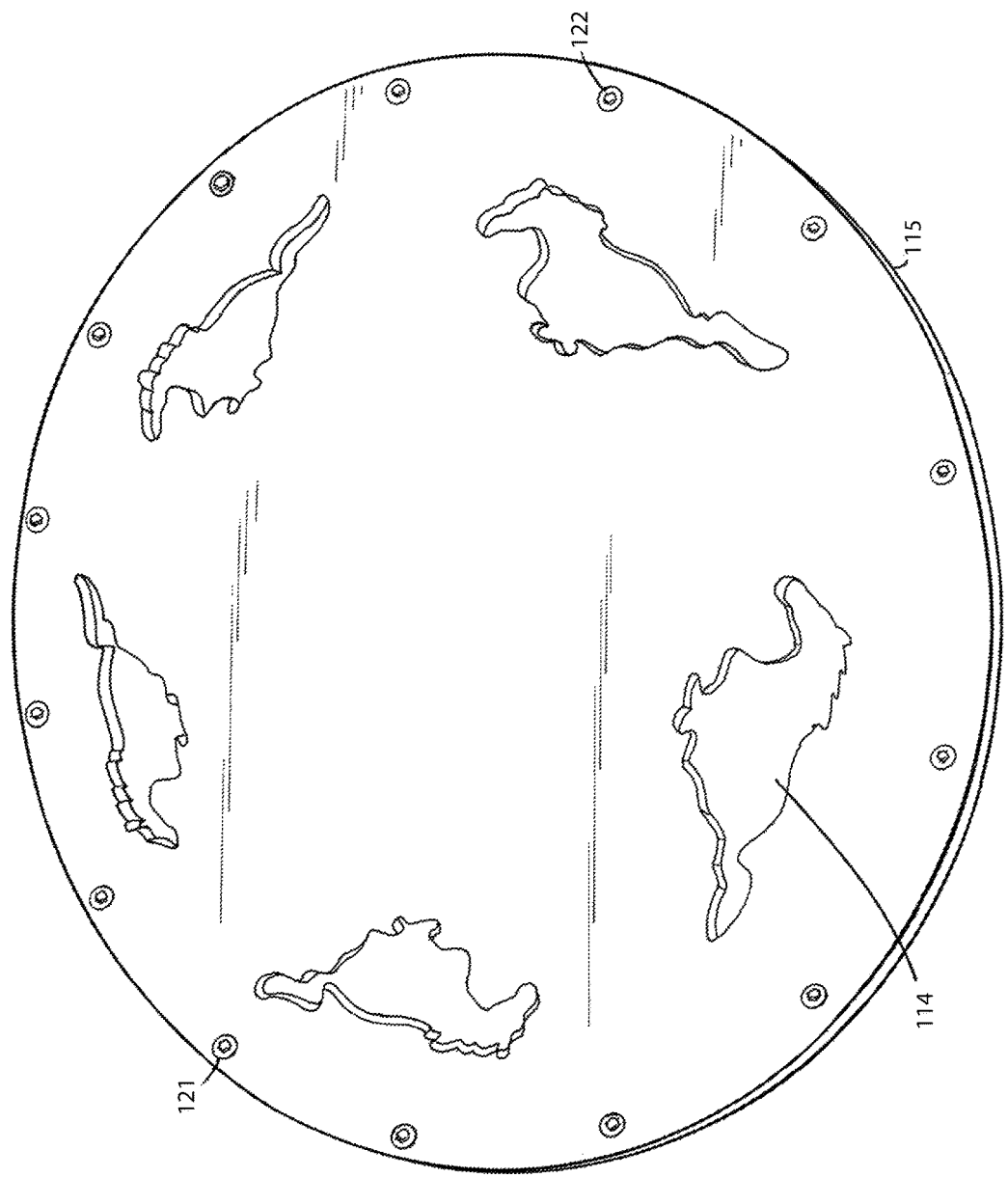
FIG. 5A shows a front plate (disk) 115 wherein the apertures 114 depict a running horse and contain alternating holes 121 and 122.

FIGS. 5, 5A and 6 show an alternative embodiment. In this embodiment only one outer spacer 118 is provided and is formed on and as an integral part of the outer periphery of the back ring 116. Also the front plate (disk) 115 only contains decorative apertures 114 and holes 121 and 122 and not the central open hole 50 shown in FIGS. 1-4. Also the spinning ring 112 is mounted on bearings 119 having groove 119A located around the outer periphery of the back ring 116. Hole 124 is threaded to accept the bolt 23.

The spinning device of the invention can be formed of any suitable material that spinners are normally made of, such as steel, die cast iron, aluminum (and alloys thereof), die cast zinc and the like. They can be chromed or painted to suit the particular vehicle that they will be used with. In a preferred embodiment the housing and spinning ring and the spacers are made from aluminum.

The wheel 31 can be of any standard design, solid, spokes, wire wheels or the like as long as it is provided with the threaded holes 22" to fit the bolts of the spinning device of the invention. Bolt studs such as shown 324 as shown is FIG. 11 can also be employed. As previously mentioned clips or other forms of attachment of the spinning device to the wheel can be used as long as it does not interfere with the spinning of the spinning ring 12. FIG. 8 illustrates an example of the front of a wheel where the bolt holes 122" are located in the spokes 51 of the wheel.

Figure 2:
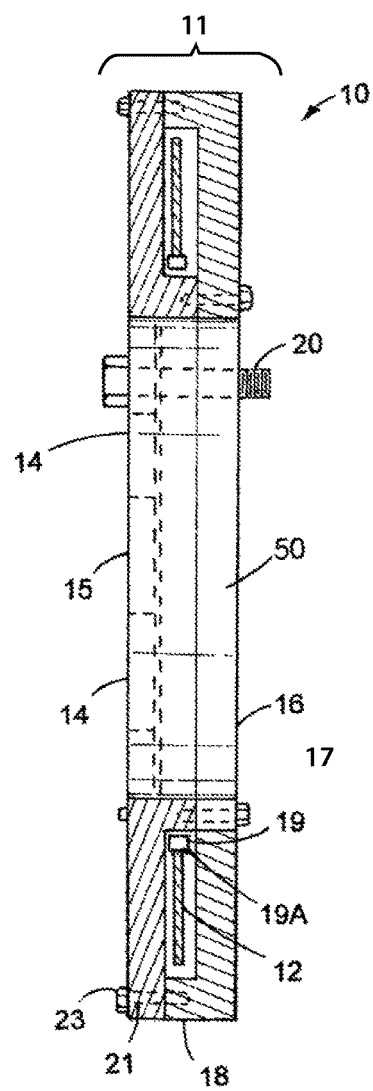
FIG. 2 is a cross-sectional side view of the embodiment of the spinning device 10 taken along an arbitrary centerline.
Figure 10:
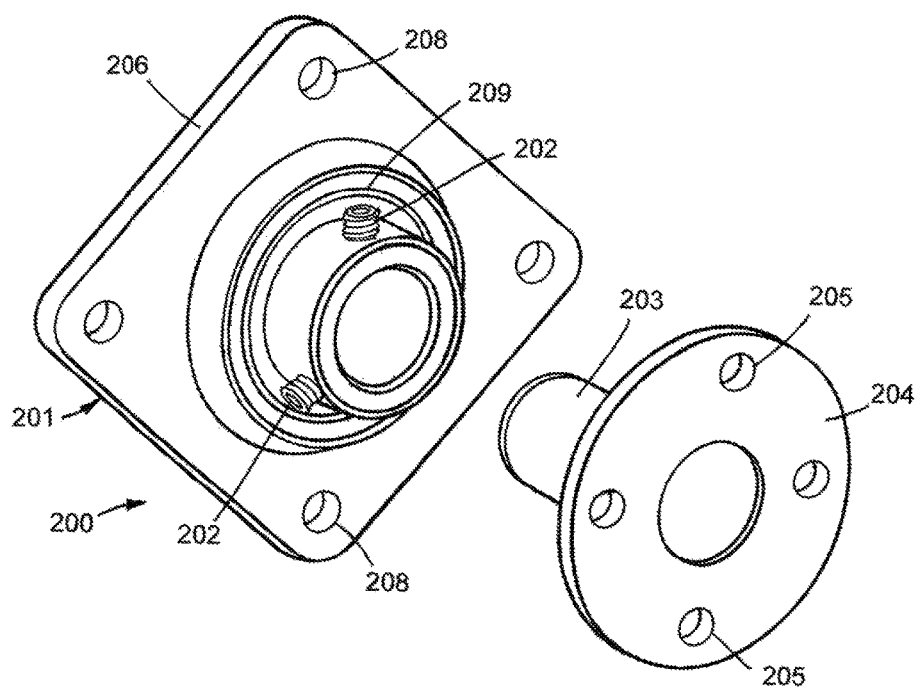
FIG. 10 illustrates an embodiment of a shaft bearing combination that can mount the spinning disk inside the housing of the invention.

As shown in FIG. 2, bearings 19 are secured around the inner spacer 17. In the embodiment in FIGS. 5 and 6 the bearings 119 are secured in the back ring of the housing such that the outer periphery circumference of spinning ring 112 is rotatably mounted on the bearings such as by fitting on the groove 119A of the bearings. The spinner bearings 19 are preferably ball bearings as known in the art. Idler bearings where the outer ring rotates and the inner ring is stationary are suitable. These bearings are available on the market and can be bolted or otherwise affixed, such as by bolting, to either the front ring or the back ring. Preferably at least four idler bearings are equally spaced around the front or back ring on a circumference that permits the inner circumference of a spinning ring having a centrally located hole as is FIG. 2, or the outer circumference as shown in FIGS. 5 and 6 to sit in groove 119A on each bearing 119 to support and allow the spinning ring to rotate. There is sufficient friction in these bearings to cause the spinning ring to start to rotate when the wheel rotates and then there is sufficient momentum in the spinning ring to continue to rotate for a time after the wheel stops spinning. Bearings having a very low friction are preferred. The bearings in this embodiment contain a groove 19A or 119A which provides a place for the inner or outer circumference, or both, of the spinning ring 12 or 112 to securely rest and be maintained in alignment so as not to touch or rub on the inner surfaces of the housing. The inner or outer circumference of the spinning ring 12 is fitted to the bearings in a manner to allow it to freely rotate in the housing without touching any of the inner surfaces of the housing except for the bearings. Embodiments of the invention wherein a centrally located shaft bearing combination is used to permit the spring disk to continue to spin when the wheel stops are shown as examples in FIGS. 10-14. A useful bearing to use is illustrated in FIG. 10 commonly referred to as a flange mounted bearing unit containing 2 to 4 or more bolt holes in a flange 206 that the bearing sits in. The bearing has an open center containing for example bullet point set screws 202 to secure a shaft 203 inserted therein. The bearing usually comprises an outer ring and inner ring and secured there between a ball and cage.

The housing 11 is held together by any suitable fastening means. It can be welded or for example held together with fasteners such as threaded screws 23, FIGS. 2 and 6, which fit through holes 21, provided in the front and back rings. Rivets can also be used. The device can also be held together with adhesives and or welded.

The spinning devices, such as 10 can be made essentially weather resistant by providing a weather tight closed housing. O-rings can be provided between the contacting surfaces of the front and back rings or disks and surfaces of the spacers. The apertures 14 in the front ring can be sealed with a clear plastic such as a polycarbonate so the contrasting color 13 on the ring 12 will still show through. These means can be employed on all the embodiments described herein.

Figure 7:
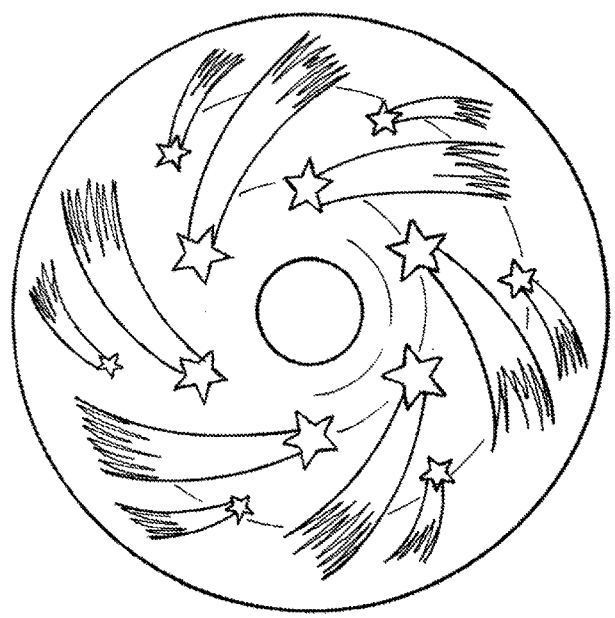
FIGS. 7, 7A and 7B show front rings having different decorative apertures formed therein and the shape of the rings is convex, concave and flat respectively.
Figure 7A:
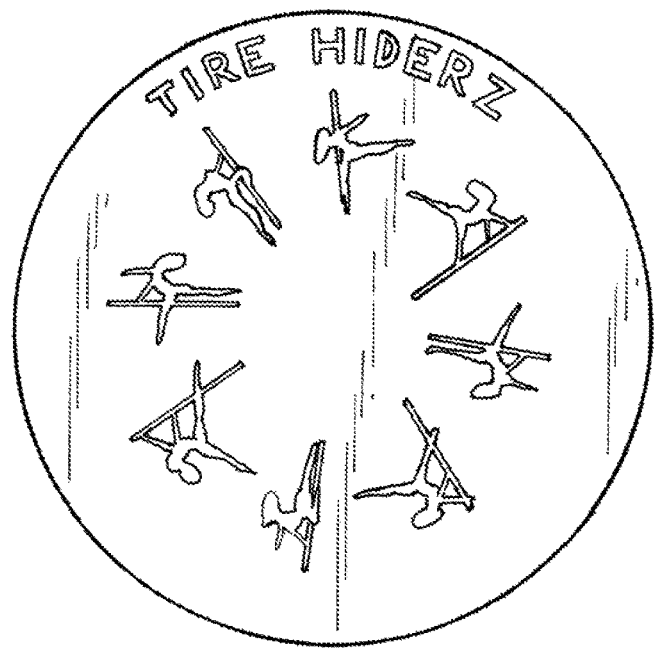
Figure 7B:
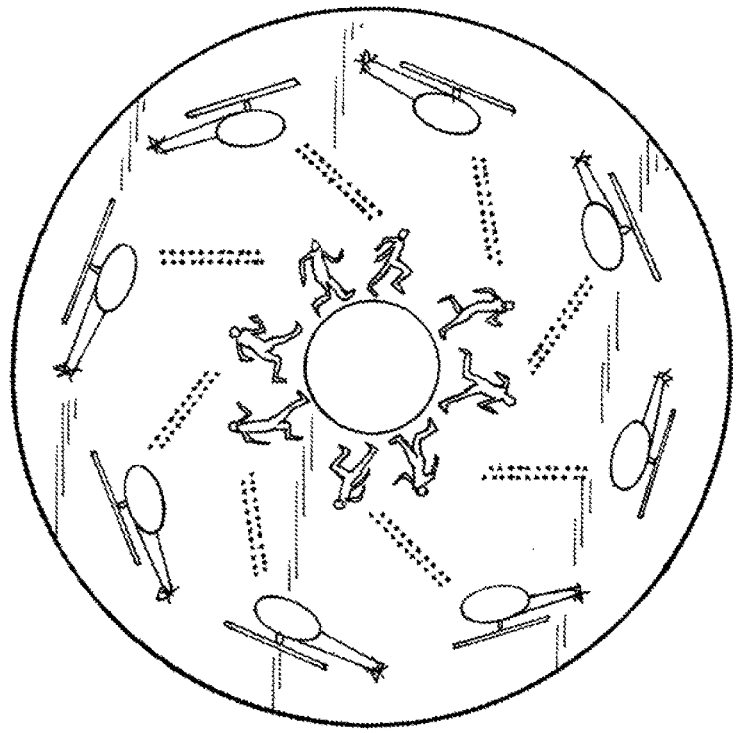
Figure 9:
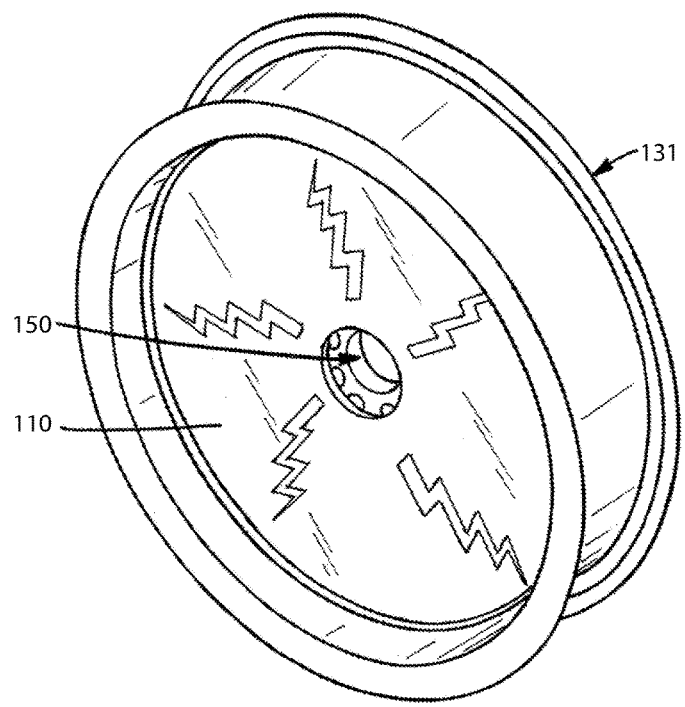
FIG. 9 shows an isometric view of a wheel 131 with the spinning device 110 attached and having a center hole 150.

The apertures such as 14 in the front disk can be of any desired design. They can be formed of letters that spell a name (FIG. 7A). A stick man can be shown in different positions so that when the ring spins the man appears to be running or walking (FIG. 7B). They can be formed of lightning bolts, FIG. 9, or shooting stars (FIG. 7) so the lightning bolt or stars appear to be moving. Other designs such as shown in FIG. 7B (helicopters) can be used. FIG. 7 shows a slightly curved front ring (convex) having a centrally located hole. FIG. 7A shows a flat shaped front ring which does not contain a centrally hole 50. FIG. 7B shows a flat shaped front ring having a centrally located hole 50. Holes 21 and 22 in the front ring (22' in the back ring) can be alternating placed but can be placed in different locations to close the housing and attach the housing to various wheel designs.

FIG. 10 illustrates an embodiment of a shaft bearing combination 200 that can be used in embodiments wherein the spinning disk is centrally secured to a bearing to permit it to continue to rotate when the wheel stops. In these embodiments the axis of the bearing and axis of the front disk, spinning disk and the back disk are aligned. The shaft bearing combination 200 comprises a flange mounted bearing 201, a shaft 203 that can be secured in the bearing 209 using for example set screws 202 such as bullet point set screws. The combination also includes a flange 204 mounted on the end of the shaft opposite to the bearing and containing bolt holes 205 for mounting onto the front disk, back disk or the spinning disk as further illustrated hereinafter. The bearing 209 is set in a flange 206, said flange containing bolt holes 208 for securing the combination centrally inside the housing of the invention. In flange mounted bearings the shaft axis is perpendicular to the flange bearing mounting surface. They incorporate a sealed bearing 209 that is preassembled into a flanged housing. The housing contains a precision ground surface perpendicular to the bearing axis and two, three or four mounting holes, depending on the style. The bearing can be bolted and unbolted and removed from the spinner of the invention either using the flange 206 or the flange mounted on the opposite end of the shaft. The flange mounted bearing supports the shaft. Two-bolt flange mounted bearings are generally diamond shaped and have two holes for mounting bolts, one on each side of the bearing. Flanges can also be used that are square, rectangular, oval or circular and may contain three or more mounting holes. A line drawn through the axis of the mounting holes forms a straight line that runs parallel to the axis of the bearing. Three-bolt flange mounted bearings have three mounting holes arranged radially around the bearing axis at 120 degrees from each other. Four-bolt flange mounted bearings have four mounting holes, located radially around the bearing axis. Four-bolt flanged bearings typically have round or square housings. Three and four bolt flanged mounted bearing are preferred in the practice of the invention. Bearings used in flange mount housings are commonly known as insert bearings. Many different bearing types can be incorporated in a flange mount housing. Roller, and ball bearings are preferred. Set screws located in an inner ring can be used to secure the end of the shaft. Locking collar bearings having a locknut can also be employed.

Figure 11:
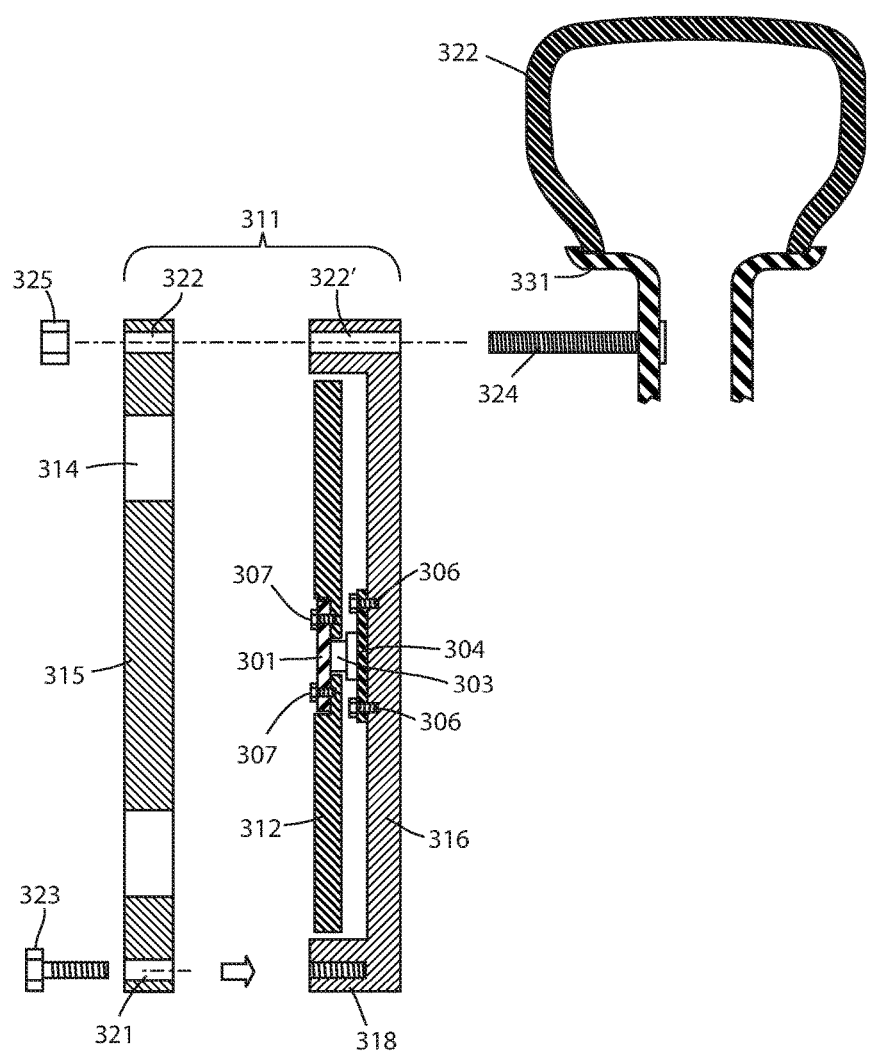
FIG. 11 illustrates a cross-sectional side view of an embodiment of the spinning device wherein the spinning disk (plate) is attached inside a housing 311 using a shaft beating combination 301 which is attached centrally inside the cavity formed by the housing 311 wherein the shaft 303 is attached to the back plate 316 by the flange 304 of the flange mounted bearing and the spinning disk 312 is attached to the shaft bearing combination so it continues to rotate after the wheel stops rotating. Also is shown a portion of a wheel 331 tire 322 combination wherein the housing is attached to the wheel using bolt studs 324 mounted in the wheel that extend through holes 322 and 322' and are secured with nuts 325.

FIG. 11 illustrates a cross-sectional side view an embodiment of the invention which employees a shaft bearing combination 301. The front view of the device would look similar to that shown in FIG. 5A where any desired aperture design is employed. The embodiment includes a front disk 315, having design apertures 314, secured to a back disk 316 defining spacer 318 using bolt 323 inserted through hole 321 formed in front disk 315 to form a housing 311 that holds spinning disk 312 employing a shaft bearing combination 301 to permit the spinning disk to rotate upon rotation of a wheel and continue to rotate for a time after the wheel stops. The front disk include holes 322 which align with holes 322' in the back disk 316 to align with threaded studs 324 mounted on the wheel 331 which can be used to secure the housing to the wheel using nuts 325. The flange mounting bearing having a flange 304 is attached to the back disk 316 using bolts 306. The spinning disk 312 is mounted to the shaft bearing combination 301 at the opposite end with bolts 307. This attachment arrangement permits the shaft to rotate upon the rotating of the wheel which urges the spinning 312 disk to rotate and then to continue to rotate when the wheel stops rotating.

Figure 12:
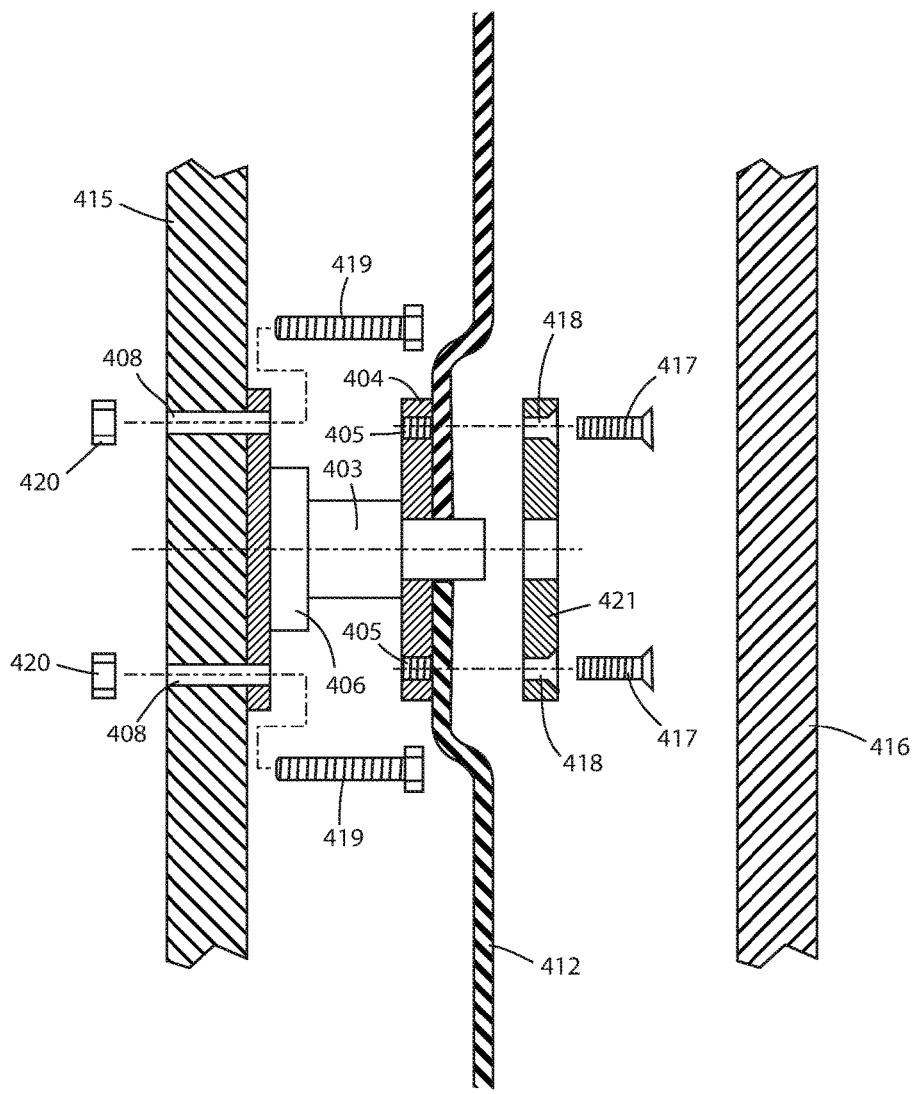
FIG. 12 illustrates a partial cross-sectional view of an embodiment using the shaft bearing combination wherein the shaft 403 is attached to the spinning disk 412 and the flange mounting bearing 406 is attached to the back side of the front plate 415 such that the shaft 403 and the spinning disk 412 rotate when the wheel stops spinning.

FIG. 12 a partial exploded cross-sectional side view of an embodiment of the spinning device wherein an alternative attachment of a shaft bearing combination is disclosed. In this embodiment the mounting flange bearing 406 is centrally mounted to the front disk 415 using the bolt nut combinations 419/420 through holes 408. At least two holes 408 and bolt nut combinations are used, more preferably four holes 408 nut bolt combinations are used. A mounting flange 404 is secured to the shaft 403 at the end of the shaft opposite to the bearing and the spinning disk 412 is mounted to this flange using a second flange 421 on the other side of the spinning disk 404 and secured with flat head screws 417 through holes 418 in the second flange 421 in threaded holes 405. When the spinning disk 412 is so mounted the bearing 406 rotates with the rotation of the wheel to which the device is mounted which rotates the shaft and rotates the spinning disk which then continues to rotate for a while after the wheel and the beating stop rotating. The front disk 415 and the back disk 416 are secured together as previously discussed to form a housing that is attached to a vehicle wheel to provide the unique spinning device of the invention.

Figure 13:
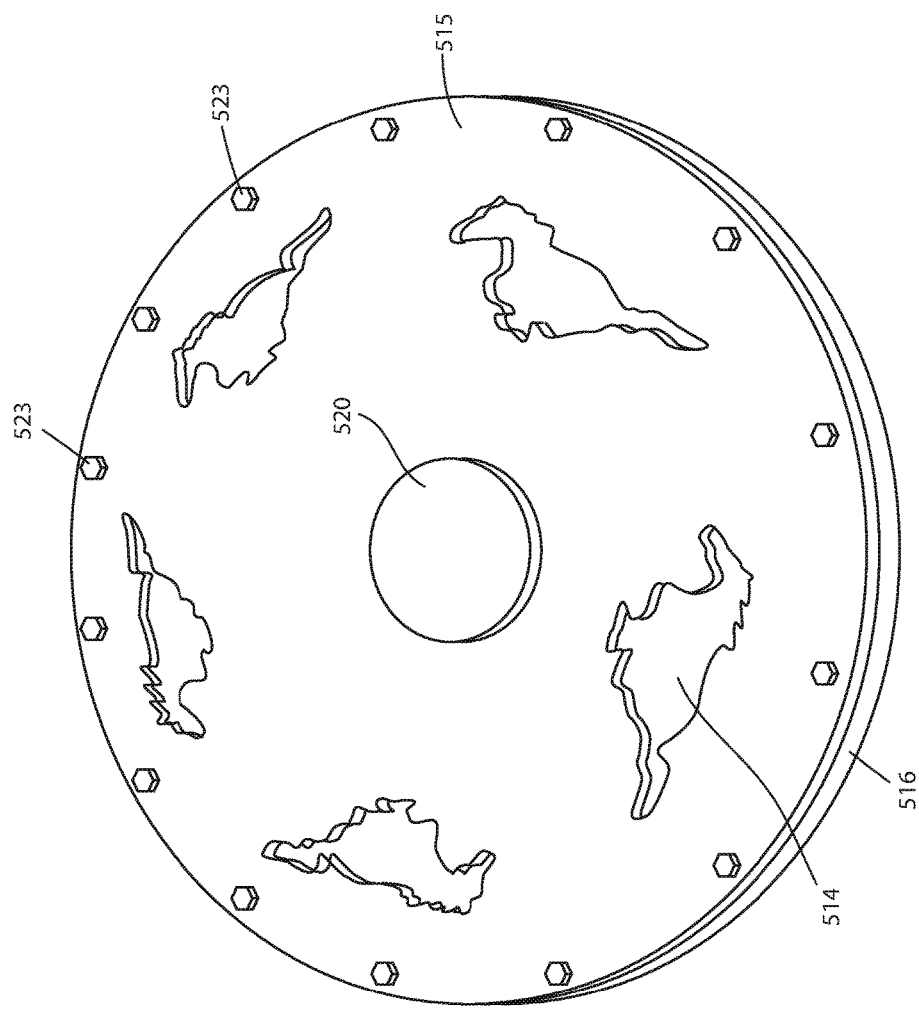
FIGS. 13 and 13A illustrates an isometric view of the assembled spinner and an exploded cross section embodiment of the spinner invention which includes a cap 520 (FIG. 13) and a cross-sectional side view of the same (FIG. 13A) wherein the shaft bearing combination is attached to the front side of the front disk 515 using cap 520 in combination with a flange 504 attached to the shaft 529 of the shaft bearing combination. The shaft extends through the front disk and the flange of the flange mounting bearing 501 is attached to the spinning disk such that the shaft stops spinning when the wheel stops rotating and the bearing and spinning disk continue to rotate.
Figure 13A:
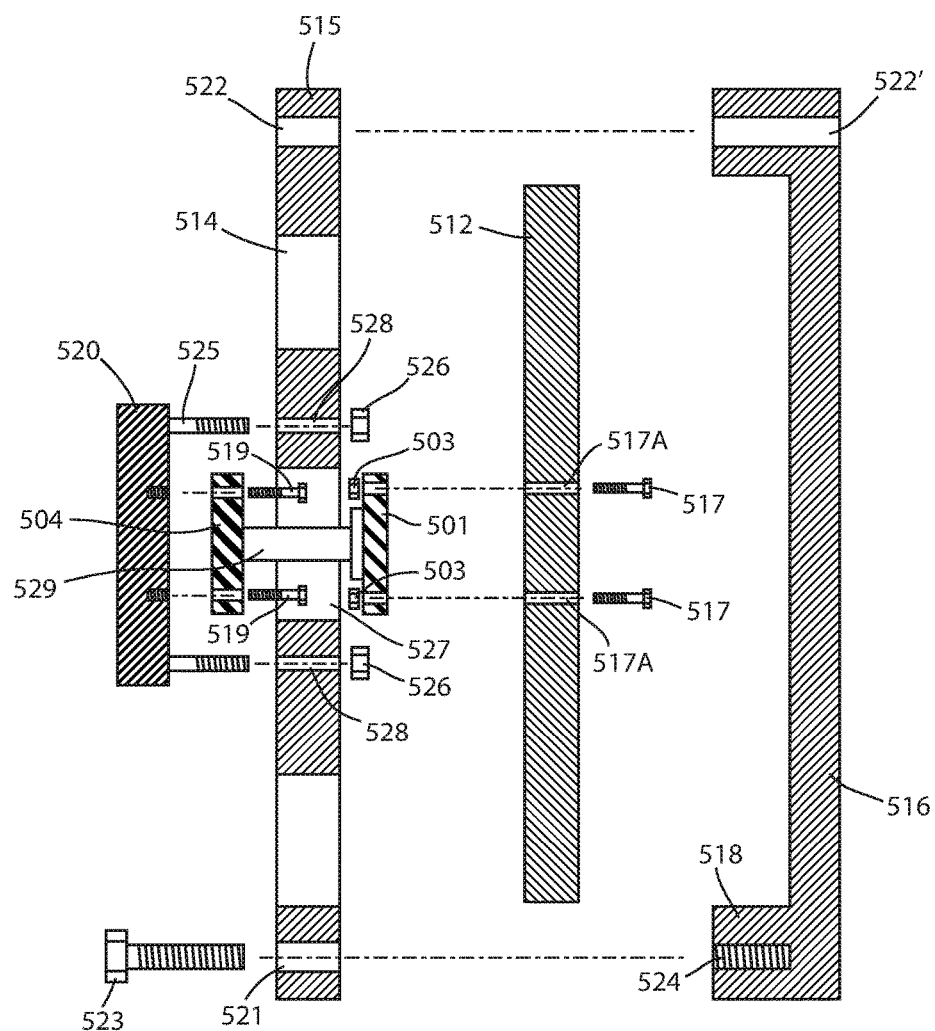

FIGS. 13 and 13A illustrate still another embodiment of the invention. In this embodiment the front disk 515 is provided with a centrally located hole 527 that permits a shaft bearing combination to slide through. The front disk is also provided with decorative apertures 514. A cap 520 is provided having a diameter which is larger than the diameter of the hole 527. The cap 520 is provided with at least two threaded studs 525 having a length that fits through holes 528 formed in the front disk 515 so it can be tightened to the front disk with nuts 526. A flange 504 is secured to shaft 529 and then to the cap 520 using bolts 519. The shaft 529 is secured to a flange mounting bearing 501 such as with set screws as shown in FIG. 10. The spinning disk 512 is then attached to the flange mounting bearing 501 using bolts 517, through holes 517A which is attached using nuts 503. The spinner is assembled as previously taught using bolts 523 through holes 521 and threaded holes 524 in the spacer 518 which is an integral part of the back disk 516. The assembled spinner (housing) is then attached to a wheel using bolts or studs through holes 522 and 522'.

FIG. 14 illustrates an exploded cross-sectional side view of an embodiment employing a convex shaped front disk 615, having decorative apertures 614, and spinning disk 612 and a flat back disk 616. The embodiment employs a shaft bearing combination to provide the means for causing the spinning disk to rotate on rotation of a wheel and to continue to rotate after the wheel to which the invention is attached stops rotating. The front disk 615 is convex shaped and is provided with an outer peripheral flat portion 615A to permit attachment to the spacer 618 which is an integral part of the back disk 616. The bearing shaft combination 600 is illustrated in FIG. 10. In the embodiment shown in FIG. 14, the flange mounting bearing 601 is attached to the spinning disk 612 using bolts 625 and nuts 626, The flange 604 attached to the opposite end of the shaft 603 is attached to the back disk 616. The flange 604 can be attached using bolts, screws, by welding or other like methods. When the spinner is assembled using bolts 623, holes 621 and threaded holes 624 and attached to a wheel through holes 622 and 622' the shaft will rotate with the rotation of the wheel and the spinning disk will rotate and continue to rotate with the flange mounting bearing 601 attached to the spinning disk 612 when the rotation of the wheel stops. Other bearing set ups such as previously described can be used such as mounting the spinning disk on its outer peripheral circumference using bearings such as shown in the FIG. 15.

Figure 15:
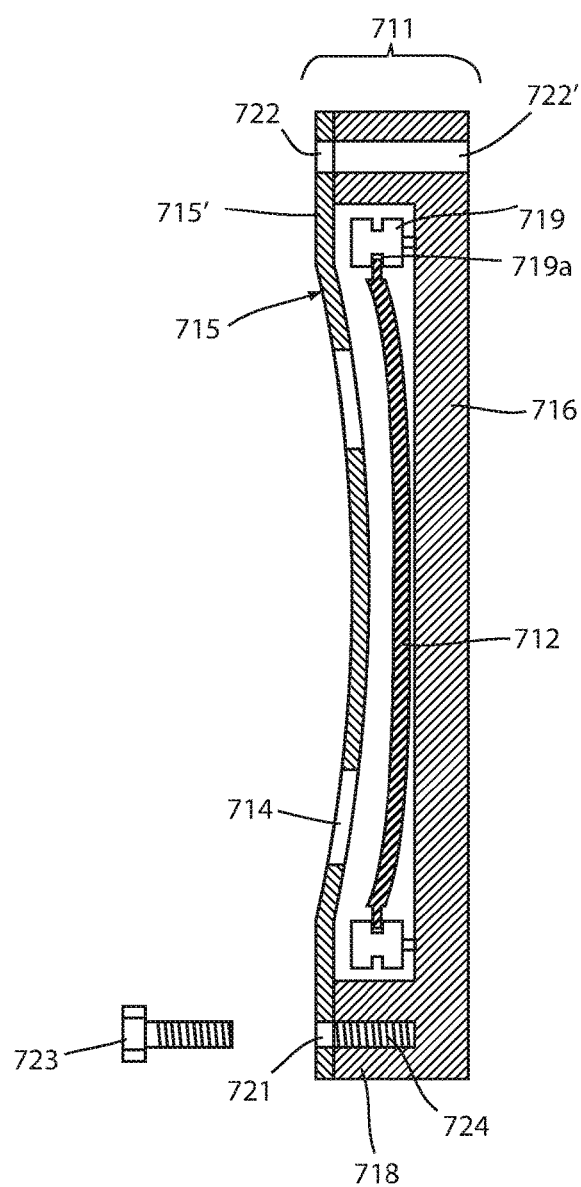
FIG. 15 illustrates a cross-sectional side view of an embodiment of the invention wherein the front plate and the spinning disk are concave shaped and the spinning disk is mounted on bearings 719 located inside the housing about the outer periphery circumference of the spinning disk 712 as in FIG. 6.

In FIG. 15 a spinner embodiment is shown using concave front disk 715 having a flat rim 715' and decorative apertures 714 and a concave spinning disk 712. This embodiment employs bearings 719 having groove 719A to position the spinning disk 712 in the housing 711 and permit its rotation during and after the wheel to which it is attached rotates and stops rotating. The housing 711 is assembled in any convenient way, illustrated using bolts 723 through holes 721 positioned in the outer periphery of the front disk 715 and threaded holes 724 positioned in the spacer 718. The assembled embodiment of the invention is attached to the outside of a vehicle wheel using holes 722 in front disk 715 and 722' in back disk 716 employing bolts or stud nut combinations as discussed hereinbefore.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A spinning device adapted to be attached to the front side of a vehicle wheel comprising:

a housing having a front circular disk and a back circular disk wherein the axis of said front circular disk and the axis said back circular disk are centrally aligned with each other and a circular ring spacer separating said front circular disk and said back circular disk forming a cavity inside said housing and said front circular disk is detachable from said back circular disk;

a spinning disk, having an axis, rotatably mounted inside said cavity;

the front circular disk having a front side and a back side and containing at least one decorative aperture formed therein;

a shaft bearing combination, having an axis, centrally attached inside said cavity to said spinning disk and to either said front circular disk or to said back circular disk said axes of said shaft bearing combination, said front circular disk, said spinning disk and said back circular disk are aligned; said shaft bearing combination comprising a flange mounted bearing, a shaft having two ends and a mounting flange, wherein one end of said shaft is mounted in said flange mounted bearing and the mounting flange is secured to the end of the shaft opposite to the end of the shaft where the flange mounted bearing is mounted; both said flange mounted bearing and said mounting flange containing at least two holes for mounting said shaft bearing combination to said spinning disk and to either said back circular disk or to said front circular disk, said spinning disk, having a front surface and a back side, is mounted within the cavity of the housing to said shaft bearing combination centrally attached inside said cavity in a manner that when the housing is attached to the front side of said wheel the spinning disk rotates inside said cavity upon rotation of the wheel and continues to rotate for a time after the wheel stops, and said front surface of the spinning disk facing the back side of said front circular disk of said housing having one section of a contrasting color to the remainder of the front surface of the spinning disk such that when said spinning disk rotates the colors showing through said at least one decorative aperture in said front circular disk change during rotation of the spinning disk, said spinning disk being free of apertures which show through said at least one decorative aperture in said front circular disk.

2. The spinning device of claim 1 wherein:
said shaft bearing combination is centrally mounted to said front circular disk and comprises said shaft, one end of which is secured in said flange mounted bearing and rotates with said bearing and extending perpendicularly in said cavity from the front circular disk and said mounting flange is mounted to said shaft at the end of said shaft opposite to the end of said shaft secured in said flange mounted bearing and said spinning disk is mounted on said mounting flange to rotate with said shaft in said cavity.

3. The spinning device of claim 1 wherein:
said shaft bearing combination is centrally mounted to the back side of said front circular disk and comprises a stationary shaft, having two ends, one end mounted to said front circular disk and said shaft extends perpendicularly from the front circular disk said shaft having said mounting flange attached on said shaft on the end of the shaft attached to the front circular disk and said spinning disk is mounted on said flange mounted bearing to rotate therewith.

4. The spinning device of claim 1 wherein said flange mounted bearing is attached to said back circular disk and said mounting flange is attached to said spinning disk.

5. The spinning device of claim 1 wherein said front circular disk is convex, concave or flat.

6. The spinning device of claim 1 wherein said mounting flange is attached to said back circular disk and said flange mounted bearing is attached to said spinning disk.

7. The spinning device of claim 1 wherein the housing is closed to make the cavity weather resistant.

8. A spinning device adapted to be attached to the front side of a vehicle wheel comprising:
a housing having a front circular disk and a back circular disk wherein the axis of said front circular disk and the axis of said back circular disk are centrally aligned with each other and a circular ring spacer separating, said front circular disk and said back circular disk forming a cavity inside said housing,
a spinning disk, having an axis, rotatably mounted inside said cavity,
the front circular disk having a front side and a back side and containing at least one decorative aperture formed therein;
a shaft bearing combination, having an axis, centrally attached inside said cavity said axes of said shaft bearing combination, said front circular disk, said spinning disk and said back circular disk are aligned with each other, said shaft bearing combination comprising a flange mounted bearing, a shaft having two ends and a mounting flange wherein said one end of said shaft is mounted in said flange mounted bearing and the mounting flange is secured to the end of the shaft opposite to the end of the shaft where the flange mounted bearing is mounted; and wherein said flange mounted bearing is attached to said back circular disk and said mounting flange is attached on said spinning disk;
said spinning disk, having a front surface and a back side, is mounted within the cavity of the housing to said shaft bearing combination centrally attached inside said cavity in a manner that when the housing is attached to the front side of said wheel the spinning disk rotates inside said cavity upon rotation of the wheel and continues to rotate for a time after the wheel stops, wherein said flange mounted bearing is attached either to the back circular disk or to said spinning disk, and
said front surface of said spinning disk facing the back side of said front disk of said housing having one section of a contrasting color to the remainder of the front surface of the spinning disk such that when said spinning disk rotates the colors showing through said at least one aperture change during rotation of the spinning disk.

9. The spinning device of claim 8 wherein said flange mounted bearing is attached to said back circular disk.

10. The spinning device of claim 8 wherein said flange mounted bearing is attached to said spinning disk.

11. The spinning device of claim 8 wherein said front circular disk is detachable from said back circular disk.

12. A spinning device adapted to be attached to the front side of a vehicle wheel comprising:
a housing having a front circular disk and a back circular disk wherein the axis of said front circular disk and the axis said back circular disk are centrally aligned with each other and a circular ring spacer separating said front circular disk and said back circular disk forming a cavity inside said housing;
a spinning disk, having an axis, rotatably mounted inside said cavity;
the front circular disk having a front side and a back side and containing at least one decorative aperture formed therein;
a shaft bearing combination, having an axis, centrally attached inside said cavity to said spinning disk and to either said front circular disk or to said back circular disk said axes of said shaft bearing combination, said front circular disk, said spinning disk and said back circular disk are aligned, said shaft bearing combination comprising, a flange mounted bearing, a shaft having two ends and a mounting flange, wherein one end of said shaft is mounted in said flange mounted bearing and the mounting flange is secured to the end of the shaft opposite to the end of the shaft where the flange mounted bearing is mounted;
said shaft bearing combination is centrally mounted to said front circular disk and comprises said shaft, one end of which is secured in said flange mounted bearing and rotates with said bearing and extending perpendicularly in said cavity from the front circular disk and said mounting flange is mounted to said shaft at the end of said shaft opposite to the end of said shaft secured in said flange mounted bearing and said spinning disk is mounted on said mounting flange to rotate with said shaft in said cavity;
said spinning disk, having a front surface and a back side, is mounted within the cavity of the housing to said shaft bearing combination centrally attached inside said cavity in a manner that when the housing is attached to the front side of said wheel the spinning disk rotates inside said cavity upon rotation of the wheel and continues to rotate for a time after the wheel stops, and
said front surface of the spinning disk facing the back side of said front circular disk of said housing having one section of a contrasting color to the remainder of the front surface of the spinning disk such that when said spinning disk rotates the colors showing through said at least one aperture change during rotation of the spinning disk.

13. The spinning device of claim 12 wherein said front circular disk is detachable from said back circular disk.

* * * * *